United States Patent [19]
Gaudry

[11] 3,929,437
[45] Dec. 30, 1975

[54] SEAL FOR DISPOSABLE DUST BAGS FOR VACUUM CLEANERS

[75] Inventor: Paul Emile Gaudry, Laval des Rapides, Canada

[73] Assignee: Consolidated Foods Corporation, Old Greenwich, Conn.

[22] Filed: Apr. 1, 1974

[21] Appl. No.: 457,084

Related U.S. Application Data
[63] Continuation-in-part of Ser. No. 434,057, Jan. 17, 1974, abandoned.

[52] U.S. Cl. ............... 55/367; 15/347; 15/DIG. 8; 55/373; 55/376; 55/381; 55/DIG. 2; 229/62.5
[51] Int. Cl.² ........................................ B01D 46/02
[58] Field of Search .......... 55/DIG. 2, DIG. 26, 367, 55/376, 377, 373, 381; 15/347, DIG. 28; 229/62.5

[56] References Cited
UNITED STATES PATENTS

| | | | |
|---|---|---|---|
| 2,732,911 | 1/1956 | Gall | 55/DIG. 2 X |
| 3,432,998 | 3/1969 | Downey | 55/DIG. 2 X |
| 3,452,520 | 7/1969 | Fesco | 55/DIG. 2 X |
| 3,495,386 | 2/1970 | Bixler et al. | 55/DIG. 2 X |
| 3,498,031 | 3/1970 | Fesco | 55/DIG. 2 X |
| 3,535,855 | 10/1970 | Howard et al. | 55/DIG. 2 X |
| 3,728,847 | 4/1973 | Howard et al. | 55/DIG. 2 X |
| 3,751,881 | 8/1973 | Hughes | 55/367 |

*Primary Examiner*—Frank W. Lutter
*Assistant Examiner*—William Cuchlinski, Jr.

[57] ABSTRACT

An improved arrangement for substantially closing the small hole in the sheet rubber closure of the inlet of a disposable dust bag when the bag containing dirt is removed from a vacuum cleaner. The inlet to the bag is a generally circular opening formed in a stiff disc of cardboard or the like and of a size sufficient to receive an inlet conduit. This opening, except when the bag is in place in the cleaner, is substantially closed by a thin sheet of rubber formed with a small aperture. Prior to insertion of the inlet conduit, a pair of tongues extend side by side across the inlet opening from opposite sides thereof and are preferably integral with the cardboard disc. The opposite end of each tongue is connected to the disc by a small frangible section so that when the inlet conduit is inserted, it breaks these sections and bends the tongues inwardly, forcing them through the aperture which they enlarge, by stretching the rubber, sufficiently to receive the inlet conduit. The bags are made of filter paper and are frequently provided with a liner of filter material such as paper wadding for restraining fine dust from clogging the pores of the filter paper. This wadding is easily torn and hence the broken ends of the tongues should be rounded so as to avoid tearing the liner when the tongues enter the bag. When the conduit is withdrawn, preparatory to removing the bag after it has been filled with dirt, the tongues continue to extend through the aperture which contracts around them and consequently they substantially close the aperture.

8 Claims, 5 Drawing Figures

3,929,437

SEAL FOR DISPOSABLE DUST BAGS FOR VACUUM CLEANERS

This application is a continuation-in-part of my co-pending application Ser. No. 434,057, filed Jan. 17, 1974, now abandoned and relates back thereto for all common subject matter.

BACKGROUND OF THE INVENTION

Heretofore, for many years it has been the practice to make dust bags with seals similar to that above described, but with a single tongue. This construction has proved to be generally very satisfactory, but it sometimes happened that when inserting the inlet conduit, the single tongue did not enlarge the aperture symetrically with the result that a portion of the rubber sheet extended across the inner open end of the conduit and acted as a reed to produce a raucous sound when the air started to flow into the bag.

SUMMARY OF THE INVENTION

The two tongues extending across the inlet opening from opposite sides thereof, assure that the aperture in the rubber sheet will be enlarged substantially symetrically so that the conduit will freely extend through the sheet and no part of the latter will extend across the open end of the conduit.

DESCRIPTION OF THE INVENTION

Figure 1:
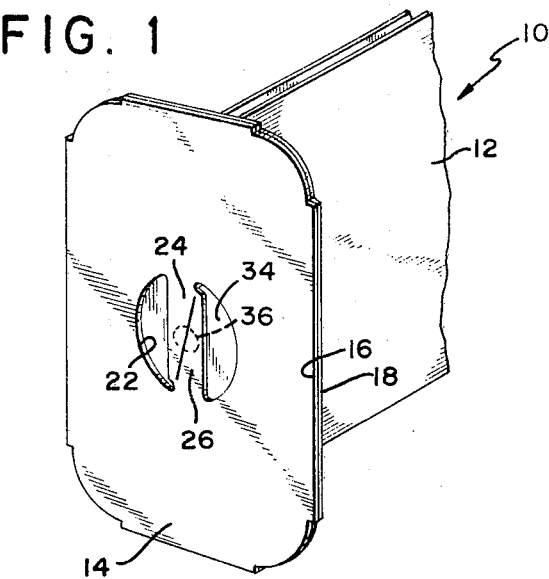
FIG. 1 is a prospective view of portion of a disposable dust bag for a vacuum cleaner embodying my invention, the bag portion being folded in the manner in which it often is initially placed in a vacuum cleaner.
Figure 2:
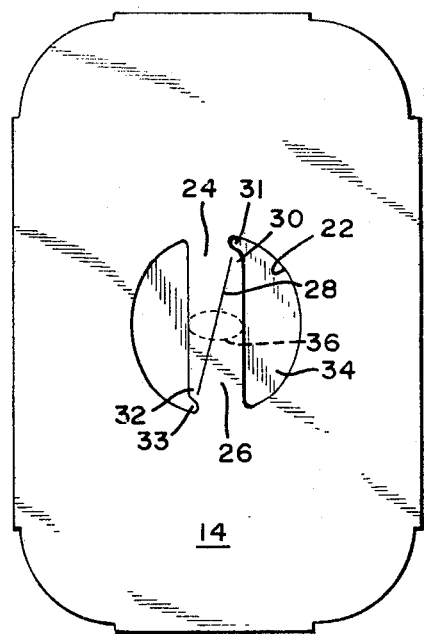
FIG. 2 is a front view of the bag shown in FIG. 1.

Referring to the drawings, reference character 10 designates generally a disposaable dust bag for a vacuum cleaner, that is a bag which is intended to be thrown away with its contents when filled. Bag 10 comprises a bag portion 12 of filter paper of substantial strength having a liner 13 of filter material such as easily torn paper wadding which permits the passage therethrough of air while retaining dust and other solid particles. The otherwise open end of the bag portion is secured to a generally rectangular disc 14 of relatively stiff material such as cardboard. Disc 14 is preferably constructed of two layers 16 and 18, as shown more particularly in FIG. 3. The inner layer 18 is formed with a generally circular inlet opening 20 while the outer layer 16 is formed with a similar opening 22 except that it is initially spaned by a pair of triangular tongues 24 and 26 disposed side by side and separated from each other by a diagonal slit 28. The tongues 24 and 26 are preferably integral with the outer layer 16, the connections between the narrow ends of the respective tongues and the rest of the layer 16 being small frangible sections 30 and 32, as seen in FIGS. 1 and 2. The layer 16 of the disc is formed with notches 31 and 33 in the tongues 24 and 26, respectively, adjacent to the ends of slit 28, for a purpose to appear hereinafter.

Laminated between the layers 16 and 18 of disc 14 is a thin sheet of rubber or other elastomeric material 34 formed with a normally small aperture 36 disposed underneath the tongues 24 and 26 as best seen in FIG. 2.

Figure 3:
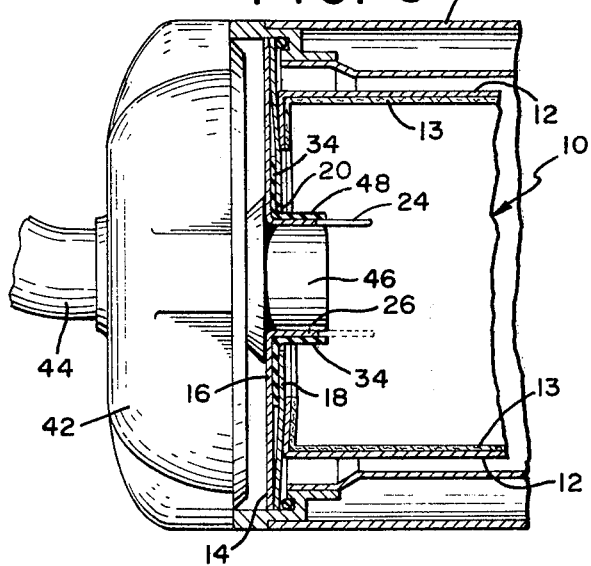
FIG. 3 is a cross-sectional view of a dust bag embodying my invention in place in a partly cross-sectioned vacuum cleaner.
Figure 4:
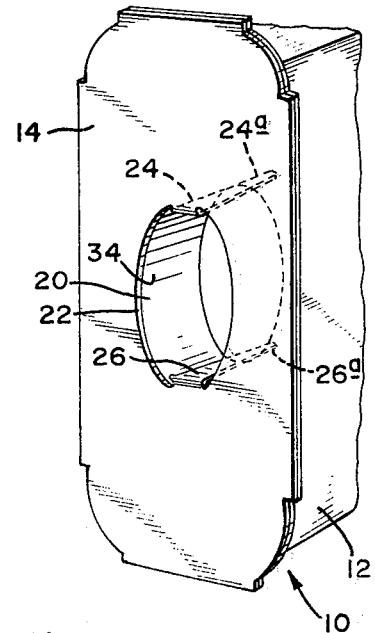
FIG. 4 is a prospective view of the bag with the parts thereof in the same position as shown in FIG. 3.

In FIG. 3, the dust bag 10 is shown in place within a vacuum cleaner having a body 40 and a removable front cover 42. The cover is formed with an air passage therethrough to the outer end of which may be connected a flexible suction hose 44, the inner end of the passage communicating with an inlet conduit 46 which is slightly smaller than the inlet openings 20 and 22 in disc 14. When the cover 42 is closed with the bag 10 in place, the inlet conduit 46 penetrates the openings 20 and 22 by breaking the frangible sections 30 and 32 and bending the tongues 24 and 26 to the positions shown in FIG. 3, that is at about right angles to the rest of disc 14. The notches 31 and 33 assure that when the frangible sections 30 and 32 are broken the narrow ends of the tongues 24 and 26 will be rounded, rather than pointed, which is desirable as pointed ends could catch and tear the liner 13 if the newly inserted bag were not fully opened out from the folded condition shown in FIG. 1. As the tongues are bent in opposite directions they stretch the rubber sheet 34 so as to symetrically enlarge the aperture 36 sufficiently to receive the inlet conduit 46, and to assure that no part of the sheet extends across the open inner end of the conduit. FIG. 4 is a perspective view showing the tongues 24 and 26 in the positions they occupy in FIG. 3, but the cover 42 and inlet conduit 46 have been ommited for the sake of clarity.

If but one tongue were present, for example tongue 24, it could happen that a portion of sheet 34 in the neighborhood of point 48 on the opposite side of conduit 46 from tongue 24 might not be forced clear of the open end of the conduit, but would extend across the edge thereof. Should this occur, the flow of air through conduit 46 into the bag would cause the rubber sheet to vibrate like a reed and produce an objectionable raucous noise. The sheet could also create a restriction by covering over a portion of the opening defined by the inner end of the suction tube 48 thereby impairing the entrainment of dirt by reducing air flow, and causing a build-up of dirt in the suction tube which, in time, will cause a total blockage of the opening.

During operation of the vacuum cleaner, air and entrained dirt are drawn in through the hose 44 and conduit 46 to the interior of bag 10 by means of a motor drive fan (not shown). The air passes through the porous filter paper of bag portion 12 and liner 13 while the dirt is retained.

Figure 5:
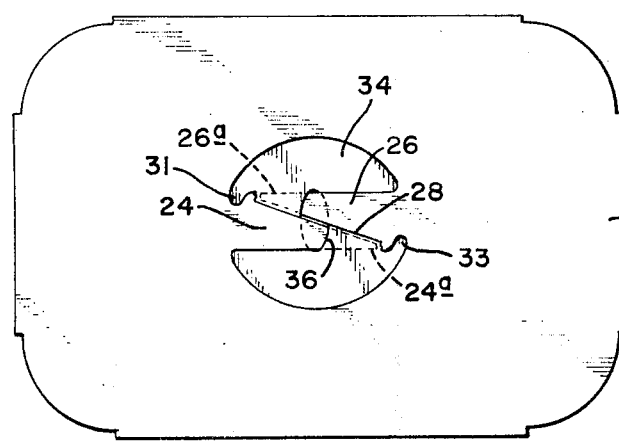
FIG. 5 is a front view of the bag showing the parts in the positions they occupy after removal from the vacuum cleaner.

When the bag has been sufficiently filled with dirt, it should be removed and thrown away with its contents. To do this, front cover 42 is opened, thus withdrawing inlet conduit 46 from openings 20 and 22 in disc 14. As the conduit is withdrawn, the elasticity of sheet 34 causes aperture 36 to contract, thus forcing tongues 24 and 26 back towards the plane of disc 14. However, the tongues are not withdrawn from the aperture 36, but the narrow end of each tongue remains within the bag, as is shown in FIG. 5. Thus, the narrow end 24a of tongue 24 and the narrow end 26a of tongue 26 are within the bag, the two tongues crossing, so to speak, where they pass through the aperture 36, consequently substantially closing the latter so as to practically eliminate the possibility of spilling dirt from the bag during its removal and disposal.

While I have shown and described one more or less specific embodiment of my invention, it is to be understood that this has been done for the purposes if illustration only and that the scope of my invention is not to be limited thereby, but is to be determined by the appended claims.

I claim:

1. In a vacuum cleaner dust bag, a bag portion of air permeable and dust retaining material, a relatively stiff disc member secured to said bag portion and formed with an inlet opening into the bag portion, and a thin sheet of elastomeric material extending across said opening and formed with a normally small aperture located centrally of said opening, said disc including a pair of tongues extending side by side across said opening and covering said aperture, one end of the respective tongues being permanently integral with the remainder of the disc at opposite sides of said opening and being secured thereto at their other ends by frangible sections.

2. A dust bag as defined in claim 1 in which said tongues are triangularly shaped and have their broader ends permanently integral with the remainder of the disc.

3. A dust bag as defined in claim 2 in which each tongue is formed with a notch at its broader end adjacent to the frangible section of the other tongue.

4. A dust bag as defined in claim 2 in which said bag portion includes a lining of filter material, each of said tongues being formed with a notch at its broader end adjacent to the frangible section of the other tongue.

5. A dust bag as defined in claim 1 in which said disc comprises an inner layer and an outer layer, said bag portion being secured to said inner layer and said tongues being integral with said outer layer.

6. A dust bag as defined in claim 5 in which said sheet of elastomeric material is laminated between said inner and outer layers.

7. A dust bag as defined in claim 1 in which each of said tongues is formed with a notch at its permanently integral end adjacent to the frangible section of the other tongue.

8. A dust bag as defined in claim 1 in which said bag portion includes a lining of filter material, each of said tongues being formed with a notch at its permanently integral end adjacent to the frangible section of the other tongue.

* * * * *